(12) United States Patent
Jennings et al.

(10) Patent No.: US 9,469,718 B2
(45) Date of Patent: Oct. 18, 2016

(54) LOW DENSITY ATTACHED POLYURETHANE FOAMS MADE BY CONTAINMENT OF BLOWING AGENTS DURING FOAM PROCESSING

(75) Inventors: James K. Jennings, Rocky Face, GA (US); Thomas H. Perry, Dalton, GA (US); Randall C. Jenkines, Dalton, GA (US); Allen L. Atkinson, Dalton, GA (US)

(73) Assignee: Dow Global Technologies LLC, Midland, MI (US)

( * ) Notice: Subject to any disclaimer, the term of this patent is extended or adjusted under 35 U.S.C. 154(b) by 1243 days.

(21) Appl. No.: 11/655,653

(22) Filed: Jan. 19, 2007

(65) Prior Publication Data

US 2007/0197674 A1 Aug. 23, 2007

Related U.S. Application Data (60) Provisional application No. 60/760,668, filed on Jan. 20, 2006.

(51) Int. Cl.
| | | |
|---|---|---|
| *C08G 18/48* | (2006.01) | |
| *B32B 5/28* | (2006.01) | |
| *C08G 18/12* | (2006.01) | |
| *C08G 18/66* | (2006.01) | |
| *C08G 18/76* | (2006.01) | |
| *C08J 9/30* | (2006.01) | |
| *C09D 175/08* | (2006.01) | |
| *B32B 5/20* | (2006.01) | |
| *B32B 5/24* | (2006.01) | |
| *C08G 101/00* | (2006.01) | |
| *C08L 83/00* | (2006.01) | |

(52) U.S. Cl.
CPC ............ *C08G 18/4841* (2013.01); *B32B 5/20* (2013.01); *B32B 5/245* (2013.01); *B32B 5/28* (2013.01); *C08G 18/12* (2013.01); *C08G 18/4812* (2013.01); *C08G 18/6674* (2013.01); *C08G 18/6685* (2013.01); *C08G 18/7664* (2013.01); *C08J 9/30* (2013.01); *C09D 175/08* (2013.01); *B32B 2262/0253* (2013.01); *B32B 2262/0261* (2013.01); *B32B 2262/0276* (2013.01); *B32B 2264/104* (2013.01); *B32B 2266/0278* (2013.01); *B32B 2307/72* (2013.01); *B32B 2471/02* (2013.01); *C08G 2101/0058* (2013.01); *C08G 2101/0066* (2013.01); *C08J 2375/08* (2013.01); *C08L 83/00* (2013.01)

(58) Field of Classification Search
CPC ........... B32B 5/20; B32B 5/245; B32B 5/28; B32B 2262/0263; B32B 2262/0261; B32B 2262/0276; B32B 2264/104; B32B 2266/0278; B32B 2307/72; B32B 2471/02; C08G 18/12; C08G 18/4812; C08G 18/4841; C08G 18/6674; C08G 18/6685; C08G 18/7664; C08G 2101/0058; C08G 2101/0066; C08J 9/30; C08J 2375/08; C08L 83/00; C09D 175/08
USPC ......................... 521/130, 131, 159, 170, 174
See application file for complete search history.

(56) References Cited

U.S. PATENT DOCUMENTS

| | | |
|---|---|---|
| 4,336,089 A | 6/1982 | Asperger |
| 4,853,280 A | 8/1989 | Poteet |
| 5,104,693 A | 4/1992 | Jenkines |
| 5,578,655 A * | 11/1996 | Fiorentini ..................... 521/155 |
| 5,646,195 A | 7/1997 | Mobley |
| 6,372,810 B2 | 4/2002 | Kazmierski et al. |
| 6,491,977 B1 | 12/2002 | Doesburg |
| 6,524,978 B1 * | 2/2003 | Moore ........................... 442/85 |
| 6,780,895 B2 * | 8/2004 | Holechovsky et al. ...... 521/133 |
| 6,790,872 B2 | 9/2004 | Kazmierski et al. |

FOREIGN PATENT DOCUMENTS

| | | |
|---|---|---|
| WO | WO-2004/096882 A1 | 11/2004 |
| WO | WO-2004/096883 A1 | 11/2004 |

OTHER PUBLICATIONS

Polyurethanes Expo 2001, Sep. 30-Oct. 3, 2001, Greater Columbus Convention Center, Columbus, OH, Conference Proceedings, *DMAMP-80™: A Superior Reactive Amine Catalyst for Polyurethane Foams.*

* cited by examiner

*Primary Examiner* — John Cooney
(74) *Attorney, Agent, or Firm* — Gary C Cohn PLLC (57) ABSTRACT

Polyurethane cushions are formed on the surface of a textile such as carpet. The polyurethane is made in the reaction of a polyurethane forming composition that is frothed, and contains water as a blowing agent. The polyurethane forming composition is cured between the substrate and a containment layer, both of which prevent the blowing gasses from escaping during the curing process. The process allows low density attached cushions to be formed controllably.

20 Claims, 2 Drawing Sheets

LOW DENSITY ATTACHED POLYURETHANE FOAMS MADE BY CONTAINMENT OF BLOWING AGENTS DURING FOAM PROCESSING

CROSS-REFERENCE TO RELATED APPLICATION

This application claims benefit of U.S. Provisional Application No. 60/760,668, filed 20 Jan. 2006.

BACKGROUND OF THE INVENTION

The invention relates to carpet having a low density frothed polyurethane backing, and to methods of making such carpet.

Carpets backed with an attached polyurethane cushion have been commercially available for many years. Methods for making those carpets are described, for example, in U.S. Pat. Nos. 4,296,159, 4,336,089, 4,405,393, 4,483,894, 4,853,054, 4,853,280, 5,104,693, 5,646,195, 6,372,810 and 6,790,872.

The attached cushion is prepared by applying a polyurethane-forming composition to the back of the carpet and permitting the composition to cure in place. A cellular structure is created by incorporating a gas into the stabilized polyurethane-forming composition. There are two main ways of doing this. One way is by including a chemical blowing agent (typically water) in the composition. The chemical blowing agent reacts as the polyurethane-forming composition cures, generating a gas (typically carbon dioxide) that imparts a cellular structure to the foam. The second way, which has found favor in commercial processes, is to froth the polyurethane-forming composition by whipping air or another gas into it.

The use of chemical blowing agents is generally disfavored because these systems are difficult to process in attached cushion applications. Although chemical blowing agents are widely used to make a variety of polyurethane foams, in most of the cases the formulation is one which should react very quickly. The speed of the reaction helps the polymer to quickly build molecular weight and become viscous. The highly reactive and viscous mixture is able to capture the expansion gases as they are generated and thus prevents the foaming mixture from collapsing or even expanding at all. These fast-curing systems cannot be used easily in carpet-backing applications, because the polyurethane-forming formulation must be mixed, dispensed onto the carpet, spread over the carpet back and gauged. It is very difficult to accomplish all of these processing steps before a chemically blown polyurethane formulation cures to an extent that it becomes unworkable. Thus, for example, U.S. Pat. No. 4,405,393 to Tillotson describes a chemically blown polyurethane system for forming attached cushions onto carpet. Tillotson describes the need to carefully control his process in order to avoid forming pockets of gas that escape from the expanding polyurethane formulation. In addition, these processes require a fast-traversing mix head and/or messy air knife to spread the mixture onto the substrate. In practice, these problems of process control have severely limited the use of chemically blown systems in commercial scale carpet backing operations.

For this reason, commercial processes almost uniformly use a frothed polyurethane system. These systems are formulated so that they react slowly when first mixed. The slow initial cure allows enough time for the formulation to be mixed, dispensed, applied uniformly to the back of the carpet and gauged. The gauged foam formulation is thereafter cured relatively quickly by exposing it to an elevated temperature.

The problem with frothed systems is that it is difficult to produce a density of below 10-12 pounds/cubic foot in the cured polyurethane foam. Lower foam densities are desired in certain carpet products, to obtain a softer feel, because performance demands are less stringent, or simply to reduce costs. The inability to produce lower density frothed polyurethane carpet backings has limited the range of carpet products that have been produced with attached polyurethane cushions.

In some cases, water has been incorporated into frothed polyurethane carpet backing formulations. Examples of this practice are described, for example, in U.S. Pat. Nos. 4,853,280 and 6,372,810. In the process described in U.S. Pat. No. 4,853,280, an attached polyurethane cushion is prepared from a frothed system, to which about 0.1% by weight of water (~0.2% based on the unfilled system) is added. The density of the resulting cushion is reported as 11 pounds/cubic foot. In U.S. Pat. No. 6,372,810, about 10-fold higher levels of water are incorporated into a frothed foam formulation. However, the density of the resulting attached cushion is still reported as over 12 pounds/cubic foot. The additional water does not result in a further reduction of froth density, even taking into account the higher filler levels reported the examples of U.S. Pat. No. 6,372,810.

Thus, a practical, easily controllable method by which a lower density, attached polyurethane cushion can be applied to carpet or other textiles is an unmet need in this industry.

SUMMARY OF THE INVENTION

This invention is a process comprising:

a) forming a frothed polyurethane-forming composition having a density of about 300 to 600 grams per liter and exhibiting a gel time of at least 180 seconds, the polyurethane-forming composition including at least one polyol, at least 0.25 parts of water per 100 parts by weight polyol, and at least one polyisocyanate in an amount sufficient to provide an isocyanate index of from 85 to 130;

b) forming a layer of the frothed composition between a substrate and a containment layer; and c) curing the frothed composition between the substrate and containment layer to form a foamed polyurethane cushion having a density of no greater than 10 pounds/cubic foot bonded to the substrate or to both the substrate and containment layer.

The process of the invention permits good quality polyurethane cushions to be attached to a variety of substrate materials, of which textiles such as carpet are of particular interest. Attached cushions having densities of below 10 pounds/cubic foot are readily prepared in a process that is practical for commercial scale implementation.

DETAILED DESCRIPTION OF THE INVENTION

The process of the invention is characterized in that the polyurethane-forming composition is both frothed and chemically blown, and in that the polyurethane-forming composition is formed into a layer that is sandwiched between a substrate and a containment layer, as described more fully below. The polyurethane-forming layer is then cured between the substrate and containment layer. During the curing reaction, the water reacts with isocyanate groups in the polyurethane-forming composition, generating carbon dioxide gas which expands the composition and lowers its density. The cured foam has a density of no greater than 10 pounds/cubic foot. The foam density is preferably from 4 to 10 pounds/cubic foot, more preferably from 6 to 10 pounds/cubic foot and especially from 6 to 8.5 pounds/cubic foot.

The polyurethane-forming formulation is formed by mixing at least one polyol with at least one isocyanate. The mixture preferably contains at least one particulate filler. This mixture is mechanically frothed by whipping air into it, using any convenient apparatus such as an Oakes mixer, a Lessco mixer or a Hansa Frothing Unit. Methods of preparing such a mechanically frothed mixture are described in U.S. Pat. Nos. 4,853,054, 5,104,693, 5,908,701, 6,040,381, 6,096,401 and 6,555,199, all incorporated herein by reference.

Water may be mixed into the polyol component formulation (typically after the polyol is mixed with filler), prior to the point at which the polyol is mixed with the polyisocyanate, surfactant, catalyst and other components. However, it is preferred to introduce the water stream to the mixture of the filled polyol, polyisocyanate and surfactant, immediately prior to the frothing step, simultaneously with it, or less preferably, after the frothing step is completed. The reaction of the water with isocyanate tends to occur more rapidly than that of the polyol with isocyanate groups.

Water is conveniently added as a blend with a carrier polyol. Such a blend is often easier to mix in, because the larger volumes can be easier to meter accurately, and the higher viscosity of the polyol/water blend (compared to that of the water alone) makes it easier to mix into the other components. Additionally, selecting a polyol in which water has a high solubility increases the miscibility of the water and is believed to help disperse the water more intimately into the reaction mixture. This helps produce fine, uniform cells and can improve product durability and static load recovery. Such a carrier polyol is suitably one in which at least 30, especially at least 40, parts by weight water are soluble per 100 parts by weight polyol at room temperature (~22° C.). The mixture of carrier polyol and water suitably contains from 5 to 30% by weight water, especially from 20 to 30% water. Preferred carrier polyols include liquid (at 22° C.) homopolymers of ethylene oxide, and random or block copolymers of ethylene oxide and at least one other alkylene oxide, which contains at least 10%, more preferably at least 30%, by weight polymerized ethylene oxide.

Adequate "open time" is required to deliver, distribute and meter or gauge the froth on the substrate or containment layer. The onset of gelation can be delayed by mixing the polymerization catalyst(s) into the previously-formed froth. Catalyst addition is most preferably done simultaneously with or after the addition of the water. In the most preferred embodiments, the catalyst is added to the previously frothed composition, after the water has also been added and intimately mixed. As with the water, the catalyst is in most cases preferably added as a blend with or diluted in a polyol, to make metering and mixing easier.

When components such as catalyst are added after the frothing step, it is preferred to subject the formulation to subsequent mixing, preferably by flowing it through a static mixing device (such as a Chemineer-Kenics mixer, TAH mixer or other motionless mixing device), in order to more uniformly blend the components. A static or motionless mixer tends not to significantly degrade the froth or the distribution of the frothing gas within the froth.

The resulting frothed polyurethane-forming composition is then formed into a layer between a substrate and containment layer. The substrate is any material to which it is desired to attach the polyurethane cushion. The only requirements of the substrate are 1) it is a material to which the polyurethane can become adhered and 2) the substrate must present a physical barrier to the escape of gases from the polyurethane-forming composition as it cures. A wide variety of materials can function as the substrate, including, for example, polymeric films or sheets, carpet (including pile yarn carpet), textile fabrics, paper sheets, rigid materials such as wood, veneers, metal foils or sheets, or composites, among many others.

A semi-permeable material may also serve as the substrate, if voids or other openings in the material are small enough that they effectively become filled or "plugged" with the polyurethane-forming composition so that a barrier to the escape of gasses is created.

A substrate of particular interest is a tufted or woven carpet material, especially one having a unitary layer or that is precoated with an appropriate polymer adhesive to anchor and bind the pile yarn. The carpet includes a primary backing that defines multiple openings through which a facing fiber is tufted or woven to produce a carpet face. The primary backing is generally in the form of a woven or nonwoven scrim, and can be made of any convenient material, such as, for example, jute, polypropylene, nylon, a polyester, a polyacrylate, cotton, wool, or other material. The facing fiber also can be of any convenient material, such as wool, cotton, nylon, a polyester, an acrylic fiber, polypropylene, polyethylene, a blend of any two or more of these, or the like. The unitary layer is suitably a latex, polyurethane or, hot melt, or such a unitary backing in combination with one or more other composite layers such as a bitumen or polyolefin hot melt. The facing fiber is typically in the form of fiber bundles that are tufted or woven through the primary backing to produce a carpet face and an opposing underside. The facing fibers may also be assembled in a structure known as a bonded carpet where the yarn bundles are not tufted through a primary fabric, but are minimally adhered together with a bonding polymer. Typically, bonded carpets will have additional structural components as noted herein.

The containment layer is a material which, in the simplest aspect of the invention, must only present a physical barrier to the release of gases from the frothed polyurethane-forming composition as it cures. Thus, any material that can be used as the substrate is also useful as the containment layer. It is not necessary that the containment layer become adhered to the polyurethane (by the reaction of the polyurethane or otherwise), and in some cases it is preferred that the containment layer does not become so adhered. For example, the containment layer may be simply a conveyor belt, release fascia, or other surface upon which the polyurethane-forming composition is dispensed and formed into a layer. The containment layer may also be a release layer that is laid above or below the polyurethane-forming layer. This can be done as the polyurethane-forming layer is dispensed and gauged, or married to the surface of the polyurethane-forming composition layer before it is cured. Such a release layer is a layer of a material such as a fluoropolymer to which the polyurethane layer does not adhere. This layer may also have characteristics (such as reverse embossing) to impart texture, desired patterning, identification, or branding information onto the cured polyurethane surface.

The substrate and containment layers can in some instances interfere with the polyurethane-forming reaction, particularly if they have acidic surfaces. Substrate and containment layers having a surface pH of 9.5 or above are particularly suitable.

It is possible for one or more intermediate layers to be interposed between the layer of the polyurethane-forming composition and the containment layer. For example, a release layer, woven or non-woven scrim, or other intermediate layer may be so interposed. Such an intermediate layer is in most cases one that allows gasses to permeate easily, i.e., does not function effectively as a containment layer by itself. The intermediate layer is in most cases one that will become adhered to or embedded in the polyurethane cushion layer and will thus become part of the final product. The intermediate layer may be, for example, a scrim that provides dimensional stability, a backing that allows the product to release easily in a glue-down installation (such as in the case of an attached-cushion carpet), a layer that provides resistance to penetration by water or other fluids, a decorative layer, or any other type of functional layer as may be desirable in the particular application of interest.

In one embodiment, the polyurethane-forming composition is dispensed onto the substrate and formed into a layer of the desired thickness. The containment layer (including any intermediate layer(s) as described before) is then laid atop the layer of the polyurethane-forming composition. These steps are performed as soon as possible after the polyurethane-forming composition is fully formulated (including water and catalyst addition) and prior to any significant expansion of the polyurethane-forming composition due to the reaction of the water with polyisocyanate groups. A variety of equipment types are suitable for dispensing the polyurethane-forming composition and forming it into a layer. A preferred method of dispensing the composition is through a traversing dispensing nozzle, hose or head, which travels back and forth across the substrate to dispense the composition more or less evenly across the surface of the substrate. The composition is suitably dispensed upstream of a doctor blade, which gauges the composition to a desired thickness and helps to force the composition onto the surface of the substrate. Another suitable apparatus for forming the polyurethane-forming composition into a layer and gauging it is an air knife.

When the polyurethane-forming composition is dispensed upstream of a doctor blade, a puddle of the composition is formed. Dispensing rates and line speeds are advantageously selected to provide an average residence time in the puddle (i.e., time from dispensing to passing under the blade) of no greater than 300 seconds and preferably no greater than 200 seconds.

In another embodiment the polyurethane-forming composition is instead dispensed onto the containment layer (including any intermediate layers, if any) and the substrate is laid atop the layer of the polyurethane-forming composition.

Once the substrate, layer of the polyurethane-forming composition and containment layer are married in this manner, the polyurethane-forming composition reacts to generate a blowing gas and cure. In general, the containment layer is kept in contact with the polyurethane-forming composition layer at least until the evolution of blowing gas is complete. In preferred embodiments, this contact is maintained until the polyurethane is cured to a tack-free state.

It is within the scope of the invention to apply downward pressure on the uppermost layer of the construction (either the substrate or containment layer, as the case may be) to restrain the expansion of the polyurethane-forming composition. However, this is not usually essential to the invention provided that both the containment and substrate layers remain directly or indirectly (i.e., via an intermediate layer) in contact with the polyurethane layer as described. Thus, in other embodiments, no pressure is applied to the construct, and the polyurethane-forming layer is permitted to rise more or less freely, being constrained only by the weight of the uppermost layer of the construct (either the substrate or containment layer, as the case may be), plus that of any interposed intermediate layer or layers.

In certain embodiments of the invention, the substrate forms the bottommost layer of the composite during the manufacturing process. The containment layer therefore is applied to the top of the polyurethane-forming layer. In such cases, the substrate is advantageously supported on a belt, tenter frame or similar apparatus which permits it to be moved lengthwise relative to the point of application of the polyurethane forming composition.

In embodiments of this type, several types of containment layers are of particular interest. One type of containment layer is simply the surface of an endless belt, which is brought into contact with the top of the polyurethane layer. The surface of the endless belt is made from or coated with a material that does not adhere to the polyurethane-forming composition (or the cured polyurethane) so that the belt releases from the polyurethane layer at some point after the expansion of the polyurethane composition is complete.

A second type of containment layer includes the surface of an endless belt as just described, together with one or more porous intermediate layers that are laid onto the polyurethane composition layer. In this case, the surface of the endless belt still acts as the containment layer, as gasses can penetrate through the porous intermediate layer. The porous intermediate layer(s) will typically become adhered to the polyurethane cushion to form a multilayer structure that includes the substrate, polyurethane cushion and the intermediate layer(s).

A third type of containment layer is a substantially impervious material, optionally together with one or more intermediate layers, that becomes adhered to the polyurethane cushion to form a three (or more) layer construct including the substrate, polyurethane cushion layer, and containment layer.

A fourth type of containment layer is a semi-permeable material having small openings or voids that become plugged or filled when the material is brought into contact with the polyurethane-forming composition. In this case, the containment layer will become adhered to the composite by the cured polyurethane.

Similar constructions can be made when the containment layer forms the bottommost layer of the composite during the manufacturing process. In one such case, the polyurethane-forming composition is dispensed and spread over the surface of an endless belt, which becomes the containment layer. In another such case, a layer of an impervious material is supported on an endless belt or affixed to a tenter frame. The substrate is laid in over the polyurethane layer as described before. Intermediate layers may be interposed between the containment layer and polyurethane-forming composition, as described before.

The polyurethane-forming composition includes a polyisocyanate component and a polyol component. The polyisocyanate component includes at least one organic polyisocyanate, which may be an aromatic, cycloaliphatic, or aliphatic isocyanate. Examples of suitable polyisocyanates include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotolylene diisocyanate, naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenylmethane-4,4'-diisocyanate, 4,4',4"-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, tolylene-2-4-diisocyanate, tolylene-2-6-diisocyanate or mixtures thereof. Diphenylmethane-4,4'-diisocyanate, diphenylmethane-2,4'-diisocyanate and mixtures thereof are generically referred to as MDI, and all can be used. Toluene-2,4-diisocyanate, tolylene-2,6-diisocyanate and mixtures thereof are generically referred to as TDI, and all can be used. Polyisocyanate compounds or mixtures thereof having from about 1.8 to about 2.5 isocyanate groups/molecule, on average, are preferred, especially those having an average of about 1.9 to about 2.3 isocyanate-groups/molecule. Prepolymers made by reacting a stoichiometric excess of any of the foregoing polyisocyanates with an isocyanate-reactive compound such as those described below can be used as well. Suitable prepolymers include soft segment prepolymers as described in U.S. Pat. No. 5,104,693 and hard segment prepolymers as described in U.S. Pat. No. 6,372,810.

The polyol component includes at least one polyol having a hydroxyl equivalent weight of at least 400. The hydroxyl equivalent weight of the polyol is preferably from about 500 to about 3000, especially from about 500 to about 1500. The polyol advantageously has an average nominal functionality of from about 1.8 to about 4, especially from about 2 to about 3 hydroxyl groups/molecule. A mixture of such polyols can be used. Suitable polyols include polyether polyols and polyester polyols. Polyether polyols are generally more preferred. Particularly suitable polyether polyols are polymers of propylene oxide, which may contain up to 20% by weight terminal poly(ethylene oxide) blocks, random copolymers of propylene oxide and up to about 15% by weight ethylene oxide, poly(tetramethylene oxide) polymers and poly(butylene oxide) polymers. Suitable polyester polyols include hydroxymethyl group-containing polyester polyols of the type described in WO 04/096882 and WO 04/096883. Preferred polyols have mainly secondary hydroxyl groups, such as at least 70%, 80%, 90% or 98% secondary hydroxyl groups. Secondary groups tend to react with polyisocyanates more slowly than do primary hydroxyl groups, and may be selected to further help to delay the onset of reaction as the composition is mixed, frothed and applied.

The polyurethane-forming composition also includes water, in an amount of at least 0.25 part by weight per 100 parts by weight of the polyol. Suitable amounts are from 0.5 to about 3.0 parts of water per 100 parts by weight polyol, especially from 0.6 to 2.5 parts by weight of water per 100 parts by weight polyol and more preferably from 0.6 to 1.5 parts by weight of water per 100 parts by weight polyol.

A chain extender or crosslinker may also be present in the polyurethane-forming composition. For purposes of this invention, a chain extender is a material having two isocyanate-reactive groups/molecule and an equivalent weight per isocyanate-reactive group of from about 30 to 150. A crosslinker, for purposes of this invention, is a compound having three or more isocyanate reactive groups and an equivalent weight per isocyanate-reactive group of 150 or less. The isocyanate-reactive groups may be hydroxyl, primary amine or secondary amine groups. Chain extenders and crosslinkers having hydroxyl groups are preferred because hydroxyl groups react more slowly and thus provide more time to apply and gauge the polyurethane-forming layer. Examples of suitable chain extenders include ethylene glycol, diethylene glycol, triethylene glycol, propylene glycol, dipropylene glycol, tripropylene glycol, 1,4-dimethylolcyclohexane, diethyltoluene diamine, 1,4-butane diol, 1,6-hexane diol, 1,3-propane diol, amine-terminated polyethers such as Jeffamine D-400 from Huntsman Chemical Company, amino ethyl piperazine, 2-methyl piperazine, 1,5-diamino-3-methyl-pentane, isophorone diamine, ethylene diamine, hexane diamine, hydrazine, piperazine, mixtures thereof and the like. Amine chain extenders can be blocked, encapsulated, or otherwise rendered less reactive in order to reduce the reactivity of the formulation and provide more working time to apply and gauge the foam layer. Chain extenders and advantageously constitute up to about 30%, especially up to about 20% of the combined weight of all isocyanate-reactive materials.

The polyurethane-forming composition also preferably contains one or more catalysts, which promote the reaction of the polyisocyanate with the isocyanate-reactive materials. Suitable catalysts include tertiary amines, organometallic compounds, or mixtures thereof. Specific examples of these include di-n-butyl tin bis(mercaptoacetic acid isooctyl ester), dimethyltin dilaurate, dibutyltin dilaurate, dibutyltin diacetate, dibutyltin sulfide, stannous octoate, lead octoate, nickel acetylacetonate, ferric acetylacetonate, bismuth carboxylates, triethylenediamine, N-methyl morpholine, like compounds and mixtures thereof. An amine-blocked tin (IV) catalyst, such as those described in U.S. Pat. No. 5,491,174, can be used. A particularly preferred catalyst is a delayed action catalyst, such as the dialkyltin sulfide catalysts described in U.S. Pat. No. 5,646,195. Of the last types, dimethyl-, dibutyl- and dioctyltin sulfide catalysts are of particular interest. Catalysts may be encapsulated in wax or other low-melting material in order to provide delayed reaction.

An amount of catalyst is advantageously employed such that a relatively rapid cure to a tack-free state can be obtained, while providing enough open time that the polyurethane composition can be dispensed and spread before curing. If an organometallic catalyst is employed, such a cure can be obtained using from about 0.01 to about 0.5 parts per 100 parts of the polyurethane-forming composition, by weight. If a tertiary amine catalyst is employed, the catalyst preferably provides a suitable cure using from about 0.01 to about 3 parts of tertiary amine catalyst per 100 parts of the polyurethane-forming composition, by weight.

The polyurethane-forming composition contains a filler, which reduces overall cost and may improve flame resistance, firmness and other physical properties. The filler advantageously constitutes from about 8 to about 70 percent, such from 10 to 70, 25 to 65 or 30 to 60 percent, of the total weight of the polyurethane-forming composition. Suitable fillers include talc, mica, montmorillonite, marble, barium sulfate (barytes), milled glass granite, milled glass, calcium carbonate, aluminum trihydrate, carbon, aramid, silica, silica-alumina, zirconia, talc, bentonite, antimony trioxide, kaolin, coal based fly ash and boron nitride.

The polyurethane-forming composition also includes at least one surfactant, which serves to stabilize the foam bubbles until the composition has cured. Organosilicone surfactants, such as those described in U.S. Pat. No. 4,483,894, are preferred. Typically about 0.5 to about 3 parts of surfactant are used per 100 parts by weight polyols.

Other additives may be used, including fire retardants, pigments, antistatic agents, reinforcing fibers, antioxidants, preservatives, acid scavengers, and the like.

The individual polyols, crosslinkers and/or chain extenders, polyisocyanates, catalysts (and catalyst levels) and other components of the polyurethane-forming composition are selected so that the fully formulated composition has a gel time of at least 180 seconds. Gel time is conveniently measured by bringing all components to 20° C., mixing them at that temperature, and measuring the time required for the reacting mixture to attain a temperature of 49° C. due to heat generated by the reaction of the components. A preferred composition has a gel time of 180 to 600 seconds, especially from 180 to about 300 seconds. The composition also advantageously exhibits a cream time of at least 30 seconds and preferably from 30 to 90 seconds. Cream time is the time required for the polyurethane-forming composition to begin to expand once all ingredients are mixed.

The polyurethane composition is conveniently formed into a blended polyol component, which includes all isocyanate-reactive materials (preferably excepting the water), and a polyisocyanate component. The filler is typically blended into the polyol component beforehand. The catalyst may be added to either the polyol or polyisocyanate component (preferably the polyol component) but is preferably added to the frothed mixture as one or more separate streams. The amount of polyisocyanate used is conveniently sufficient to provide an isocyanate index, i.e. 100 times the ratio of NCO groups to isocyanate-reactive groups in the reaction mixture, of from about 85 to about 130, preferably about 90 to 125, and especially from about 95 to 115.

The polyurethane-forming composition is frothed to a froth density of about 250 to 600, especially from 315 to 500, grams/liter prior to application.

The components are preferably mixed, frothed and formed into a layer while at a temperature of no greater than 40° C., preferably from about 0° C. to about 30° C. and especially from about 18° C. to about 24° C., in order to minimize or prevent premature reaction.

The frothed composition is suitably applied at a coating weight of from about 10 to about 70 ounces/square yard (0.33-2.31 kg/m$^2$), and in particular from about 15 to about 30 ounces per square yard (0.49-0.99 kg/m$^2$). The thickness of the applied layer is generally from about 0.05 to about 0.5 inches (0.13-1.3 cm), preferably from about 0.1 to about 0.25 inch (0.26-0.65 cm).

Curing is preferably effected by subjecting the layer of polyurethane-forming composition to an elevated temperature. It is generally desirable to select a curing temperature at which the polyurethane composition will cure to a tack-free state within about 30 minutes, preferably from about 2 to about 10 minutes and especially from about 2.5 to about 5 minutes. A preferred temperature range is from 80 to 170° C., especially from about 100 to 150° C., as this range is broad enough to permit the use of a wide selection of materials as the substrate, containment layer and/or intermediate layer. Curing is conveniently performed by passing the assembly through an oven at a rate that provides the desired time at the elevated curing temperature. A heated conveyor belt may be used to provide the heating required for the cure. The substrate and containment layers may be heated somewhat, such as from 70 to 110° C. or more, prior to being contacted with the polyurethane-forming composition, so that these layers do not withdraw heat from the composition and so prolong or prevent its cure.

Therefore, a preferred polyurethane-forming composition for use in the invention will, in addition to the gel times stated above, cure to a tack-free state within 2 to 10 minutes, and preferably within 2.5 to 5 minutes, when exposed to an elevated temperature within the range of from 130 to 150° C.

During the curing step, the water reacts with isocyanate groups to evolve carbon dioxide, which nucleates and forms bubbles, and further expands the froth layer. The applied froth layer desirably expands to a density that is no greater than half that of the the original froth density (i.e., the density as the froth exits the frothing device). Expansion is desirably to a froth density of less than 200 g/L, such as from 80 to 200 g/L, preferably from about 100 to 160 g/L and more preferably from 120 to 150 g/L. After curing, the foam density is in the ranges mentioned before.

After the polyurethane is cured sufficiently, the product is advantageously cooled to below 40° C., especially below 35° C., before being flexed or bent (such as by rolling or cascading it into an accumulator device). Cooling is especially preferred in cases where the product is intended to be die-cut or designed to function as independent modules, as in the case of carpet tiles.

Figure 1:
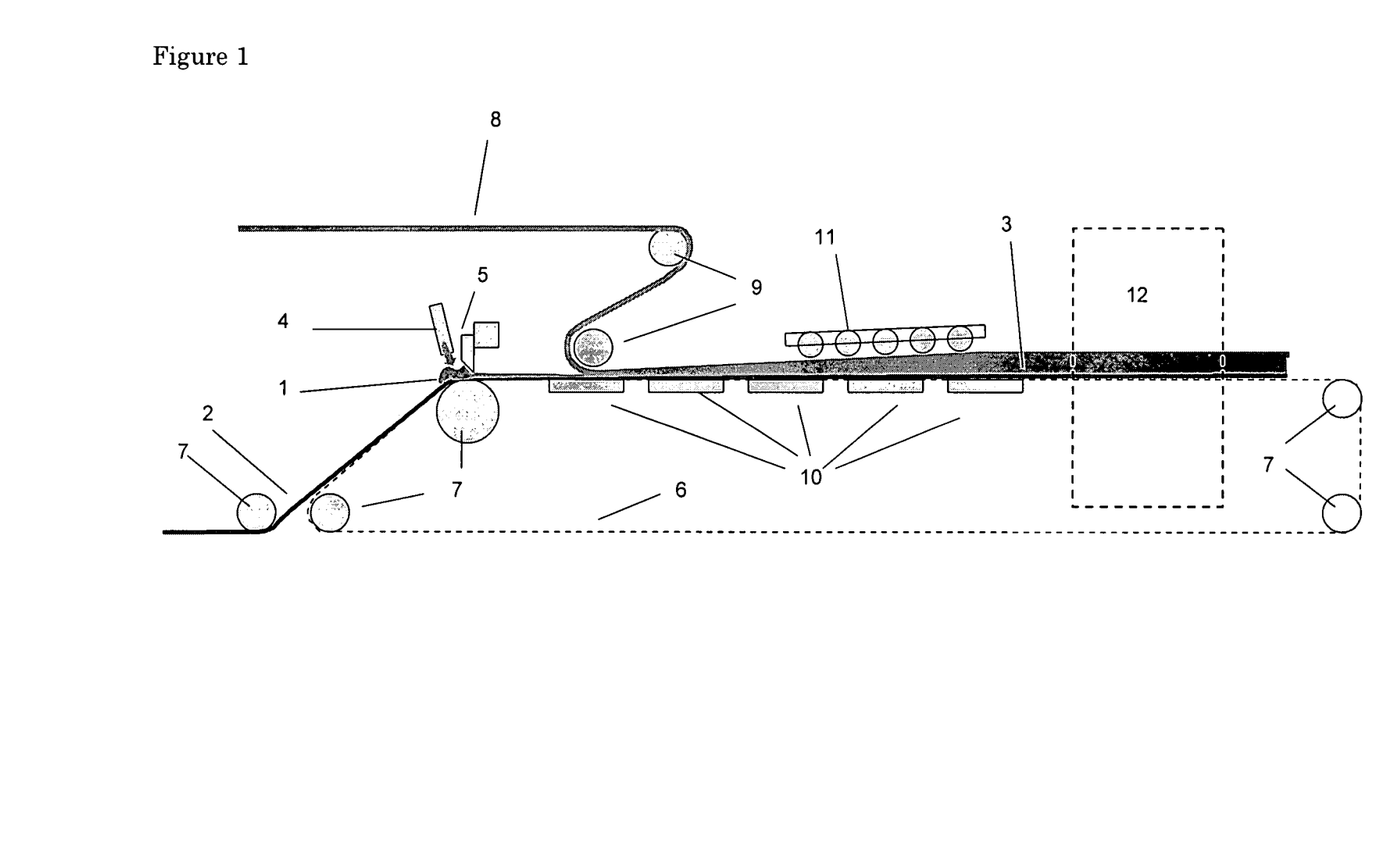
FIG. 1 is a schematic diagram of an embodiment of the process of the invention.
Figure 2:
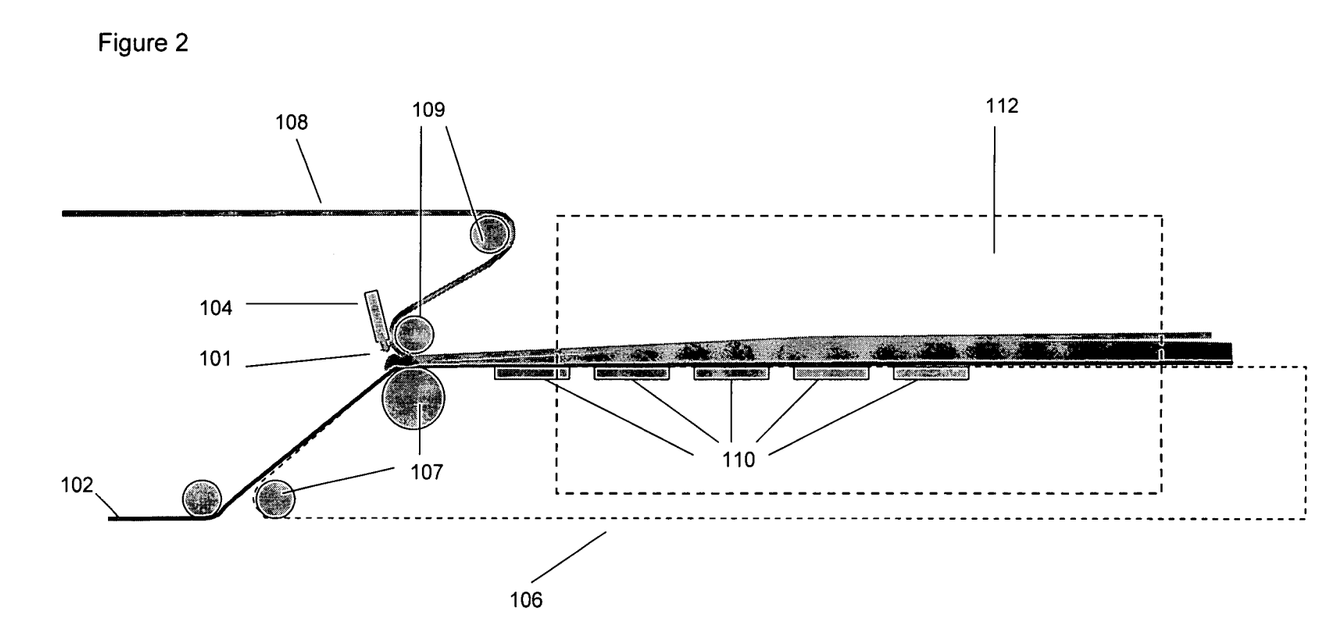
FIG. 2 is a schematic diagram of an alternative embodiment of the invention.

Embodiments of the process of the invention are shown schematically in FIGS. 1 and 2. In FIG. 1, frothed polyurethane forming composition 1 is dispensed from dispensing head 4 onto substrate 2. In this embodiment, substrate 2 is carried on endless belt 6, although a tenter frame or similar apparatus can be used instead to transport substrate 6 through the process steps. A series of rollers 7 and heated support plates 10 support substrate 2 in position relative to doctor blade 5. Doctor blade 5 forms polyurethane-forming composition 1 into a layer of a predetermined thickness. Containment layer 8 is supplied via rollers 9, and is laid onto the top surface of the applied polyurethane-forming layer. As the assembly passes heated support plates 10, the polyurethane-forming composition begins to react and expand. In the embodiment shown in FIG. 1, an optional series of pressure rollers 11 applies slight downward pressure and slightly restricts the expansion of the reacting polyurethane layer 3. This step provides a means for regauging or otherwise further controlling the thickness of polyurethane layer 3. The assembly then passes through heating station 12, in which further heat is applied to complete the cure to a tack-free state if needed.

In the embodiment illustrated in FIG. 2, substrate and containment layers are applied simultaneously or nearly simultaneously. Frothed polyurethane forming composition 101 is dispensed from dispensing head 104 onto substrate 102. As before, substrate 102 is carried on endless belt 106. A series of rollers 107 and heated support plates 110 support substrate 102. Containment layer 108 is supplied via rollers 109, and is laid onto the top surface of the applied polyurethane-forming layer immediately downstream of dispensing head 104. In this embodiment, the positions of rollers 107 and 109 determine the thickness of the polyurethane-forming layer as applied, and the doctor blade or other separate apparatus for gauging the polyurethane-forming layer is not needed. As the assembly passes heated support plates 110, the polyurethane-forming composition begins to react and expand, as before. In the embodiment shown, no downward pressure is applied to the top of the assembly, other than due to the weight of containment layer 108. If desired, additional pressure can be applied through a series of pressure rollers as described in FIG. 1 or other apparatus. The assembly then passes through heating station 112, in which further heat is applied to complete the cure to a tack-free state.

In the processes illustrated in FIGS. 1 and 2, both the substrate layers and containment layers become part of the product due to the adhesive action of the polyurethane, forming a sandwich structure. However, in either embodiment, substrate layer 2 (FIG. 1) or 102 (FIG. 2) can be omitted, in which case layer 8 (FIG. 1) or 108 (FIG. 2) will function as the substrate and belt 6 (FIG. 1) or 106 (FIG. 2) will function as the containment layer. Alternatively, containment layer 8 or 108 can be substituted with an endless belt which does not become adhered to the polyurethane and thus does not form part of the product.

The following examples illustrate the present invention but are not intended to limit the scope thereof. All parts and percentages are by weight unless otherwise indicated. Unless stated otherwise, all molecular weights expressed herein are number average molecular weight.

Example 1

100 parts of a polyol blend are mixed with 110 parts of calcium carbonate filler particles, and brought to a temperature of 12-16° C. The polyol blend is made up of 88.0 parts of a 4800 molecular weight, EO-capped polypropylene oxide) polyol and 12 parts diethylene glycol. The polyol/filler blend is mixed with 61.63 parts of a soft-segment MDI prepolymer (to provide an isocyanate index of 95). The polyisocyanate is brought to a temperature of about 25-27° C. prior to pumping and mixing. The mixture is introduced into an Oakes foamer. Five parts of a 25% by weight blend of water in a 2000 molecular weight, 12 wt-% EO-capped poly(propylene oxide) diol are introduced into the mixture immediately before frothing, after the air injection port of the Oakes foamer. Eight parts of a 25% solution of an organosilicone surfactant in the same polyol are separately injected into the head of the Oakes foamer. The resulting mixture is frothed to a density of 315 g/L. 0.7 part of a mixture of 2% dibutytin sulfide (DBTS) catalyst and 0.5% Fom-Rez UL29 catalyst (GE Engineered Products) in the same polyol are introduced after the frothing unit and blended into the froth using two Chemineer-Kenics KMR 1.5×18 static mixing units). This catalyst feed provides about 0.014 parts of the DBTS catalyst and 0.0035 parts of the UL29 catalyst. The gel time (to produce an exotherm to 49° C.) of this polyurethane-forming mixture is 260-300 seconds and the onset of expansion occurs 45 seconds after discharge from the dispensing nozzle.

The resulting polyurethane-forming composition is then dispensed through a dispensing head onto a non-woven polypropylene-polyester fabric, to form a puddle upstream of a doctor blade. The non-woven polypropylene-polyester fabric is semi-permeable to gasses until the polyurethane composition is applied, and serves as the substrate in this example. Upon application of the polyurethane composition, the pores in the fabric become clogged and the fabric becomes impermeable. The capacity of the puddle maintained behind the doctor blade is such that it would completely run out within 10 seconds if the feed nozzle were removed. The froth is gauged to a thickness of 0.130-0.140 inch (0.3-0.356 cm) using a doctor blade over roll application station. The froth density and this gauged thickness correspond to an application rate for the polyurethane forming mixture of 19.5-20.5 ounces per square yard (0.66-0.69 g/m$^2$). Average retention time behind the doctor blade is less than 180 seconds. The gauged polyurethane-forming frothed mixture and the non-woven fabric are then placed onto the endless belt and within 5-10 seconds, a containment layer consisting of a composite stabilized carpet that is preheated to 74° C. is laid in overtop the newly-formed polyurethane-forming layer. No added pressure is applied to the top of the resulting assembly, other than the weight of the containment layer itself. The resulting assembly is then cured by passing it over a heated plate range set between 120 and 165° C. The line speed is selected to provide a residence time over the heated plates of about 210 seconds. During the heating step, the polyurethane layer expands and cures. The finished composite product is cooled to below 40° C. and packaged. The finished product has a foam cushion layer of approximately 0.20-0.23 inch (0.51-0.58 cm) thick, which has a density of 7.49 lb/ft$^3$ (120 g/L). When tested on a roller chair testing device as indicated by ASTM D6962-03 (Standard Practice for Operation of a Roller Chair Tester for Pile Yarn Floor Covering), the product withstands over 25,000 cycles with 90 kg weight with no cushion lamination failure.

Example 2

Example 1 is repeated, this time omitting the DBTS and using the UL29 catalyst at at level of 0.015 parts. The water/polyol mixture is reduced to 3.6 parts and the froth density is 375 g/L. The density of the resulting polyurethane foam layer is 6.77 lb/ft$^3$ (108 kg/m$^3$).

Example 3

Example 2 is repeated using 4.56 parts of the water/polyol mixture and an isocyanate index of 90. A gel time of 230-240 seconds is observed and the froth density is 375 g/L. The density of the resulting polyurethane foam layer is 9.10 lb/ft$^3$ (145 kg/m$^3$).

Example 4

Example 3 is repeated, using only 0.013 parts of the UL29 catalyst. Froth density is 300-315 g/L. A gel time of 200-210 seconds is observed. The density of the resulting polyurethane foam layer is 8.46 lb/ft$^3$ (135 kg/m$^3$).

Example 5

Example 4 is repeated using 5 parts of the water/polyol stream. The froth density is 315-325 g/L. Gel time is 200-210 seconds. The density of the resulting polyurethane foam layer is 7.93 lb/ft$^3$ (126 kg/m$^3$).

Example 6

Example 5 is repeated using 0.01 parts each of the UL29 and DBTS catalysts. Gel time is 220-240 seconds. The density of the resulting polyurethane foam layer is about 8 lb/ft$^3$ (128 kg/m$^3$).

Example 7

102 parts of a polyol blend are mixed with 175 parts of calcium carbonate filler particles, and brought to a temperature of 12-16° C. The polyol blend is made up of 88.5 parts of a 4000 molecular weight, EO-capped polypropylene oxide) diol, 1.5 parts of an adduct of ethylene diamine, three moles of ethylene oxide and 1 mole of propylene oxide, 10 parts diethylene glycol and two parts of a viscosity reducing agent. The polyol/filler blend is mixed with 84.2 parts of a polymeric MDI (to provide an isocyanate index of 105). The polyisocyanate is brought to a temperature of about 25-27° C. prior to pumping and mixing. The resulting mixture is pumped into an Oakes foamer, where it is mixed with separate water, catalyst and surfactant streams. The water and surfactant streams are as described in Example 1, and are used at 12 parts and 24 parts respectively (to provide 3 parts of water and 6 parts of surfactant). The catalyst stream is 0.36 parts of a 5% mixture of DBTS in the same polyol as is used to add the other streams. This stream provides 0.09 part of catalyst. The mixture is frothed in an Oakes foamer to a density of 412 g/L. The resulting polyurethane-forming composition is then dispensed through a dispensing head onto a woven polypropylene fabric that is supported on a Teflon-coated fiberglass conveyer belt. The woven polypropylene fabric is substantially impermeable to gasses and serves as the substrate in this example. The composition is gauged to a thickness of 0.25 inch (0.635 cm) using a doctor blade, and a containment layer of the same woven polypropylene fabric is laid in overtop the newly-formed polyurethane-forming layer. No added pressure is applied to the top of the resulting assembly, other than the weight of the containment layer itself. The resulting assembly is then cured by passing it through a 135° C. oven. The line speed is selected to provide a residence time in the oven of about 360 seconds. During the heating step, the polyurethane layer expands and cures. The finished product is cooled to below 40° C. and cut into duplicate 77 cm² squares. The density of the foam layer is 4.82 lb/ft³ (77 kg/m³). In this example (as in each of Examples 8-18), the fully formulated polyurethane forming composition exhibits a gel time well in excess of 180 seconds.

Example 8

Example 7 is repeated, this time using a 3 mil polyurethane film as the containment layer. The density of the resulting polyurethane foam layer is 6.77 lb/ft³ (108 kg/m³).

Example 9

Example 8 is repeated, this time using only 2 parts of water and 4 parts of surfactant, and the isocyanate index is only 95. The froth density is about 430 g/L. The density of the resulting polyurethane foam layer is 8.08 lb/ft³ (129 kg/m³).

Example 10

Example 9 is repeated, this time at an isocyanate index of only 90. The froth density is 415 g/L. The density of the resulting polyurethane foam layer is 9.01 lb/ft³ (144 kg/m³).

Example 11 and Comparative Sample A 102 parts of a polyol blend are mixed with 200 parts of calcium carbonate filler particles and brought to a temperature of from about 12-16° C. The polyol blend is made up of 90 parts a 4800 molecular weight EO-capped poly(propylene oxide) triol, 10 parts diethylene glycol and two parts of a viscosity reducing agent. Two parts of water are added as a side-add to the filled polyol blend. The polyol/filler blend is then mixed with 78.16 parts of a soft segment MDI prepolymer (to provide an isocyanate index of 105) and 2 parts of an organosilicone surfactant added as a side-add stream. The polyisocyanate is brought to a temperature of about 25-27° C. prior to mixing. The mixture is frothed in an Oakes foamer to a density of 430 g/L. 0.18 parts of the 25% dibutytin sulfide solution described in Example 7 is injected into the Oakes foamer and blended in. The resulting polyurethane-forming composition is then dispensed through a dispensing head onto a needled polypropylene fabric that is supported on a Teflon-coated fiberglass conveyer belt. The needled polypropylene fabric has nylon fibers needled into a woven polypropylene structure. It is substantially impermeable to gasses and serves as the substrate in this example. The composition is gauged to a thickness of 0.25 inch (0.635 cm) using a doctor blade, and a containment layer of the same needled polypropylene fabric is laid in overtop the newly-formed polyurethane-forming layer. No added pressure is applied to the top of the resulting assembly, other than the weight of the containment layer itself. The resulting assembly is then cured by passing it through a 135° C. oven. The line speed is selected to provide a residence time in the oven of about 360 seconds. During the heating step, the polyurethane layer expands and cures. The finished product is cooled to below 40° C. and cut into duplicate 77 cm² squares. The density of the foam layer is 8.34 lb/ft³ (134 kg/m³).

Comparative Sample A is produced in like manner, except the frothed polyurethane composition is dispensed directly onto a Teflon belt, and no containment layer is applied overtop the polyurethane layer as it cures. The density of the foam layer is 18 lb/ft³ (288 g/m³).

Example 12

103.7 parts of a polyol blend is mixed with 200 parts of calcium carbonate filler particles and brought to a temperature of from about 12-16° C. The polyol blend is made up of 46 parts of a 3000 molecular weight, trifunctional random copolymer of 8 wt % EO and 92 wt % PO, 46 parts of a 2000 molecular weight, difunctional 12 wt % EO-capped poly(propylene oxide), parts diethylene glycol and two parts of a viscosity reducing agent. 1.7 parts water are added to the filled polyol blend. The polyol/filler blend is then mixed with 72.77 parts of the polyisocyanate described in Example 11 (to provide an isocyanate index of 100). The polyisocyanate is brought to a temperature of about 25-27° C. prior to mixing. 12 parts of the surfactant/polyol mixture described in Example 1 are added. The mixture is frothed in an Oakes foamer to a density of 425 g/L. 0.18 parts of the 25% DBTS/polyol blend described in Example 11 are injected into the Oakes foamer and blended in. The resulting polyurethane-forming composition is then dispensed through a dispensing head onto a needled polypropylene fabric as described in Example 11, which is supported on a Teflon-coated fiberglass conveyer belt. The needled polypropylene fabric has nylon fibers needled into a woven polypropylene structure. The composition is gauged to a thickness of 0.25 inch (0.635 cm) using a doctor blade, and a containment layer of the same needled polypropylene fabric is laid in overtop the newly-formed polyurethane-forming layer. No added pressure is applied to the top of the resulting assembly, other than the weight of the containment layer itself. The resulting assembly is then cured by passing it through a 135° C. oven. The line speed is selected to provide a residence time in the oven of about 360 seconds. During the heating step, the polyurethane layer expands and cures. The finished product is cooled to below 40° C. and cut into duplicate 77 cm² squares. The density of the foam layer is 8.58 lb/ft³ (137 kg/m³).

Example 13

Example 12 is repeated, this time reducing the amount of viscosity reducer to 1.75 parts and the amount of filler to 175 parts. In this example, the catalyst is added to the filled polyol blend before it is mixed with the polyisocyanate, and the water stream (10 parts, to provide 2.5 parts water) is added by injecting it into the Oakes foamer. The isocyanate index is 105. The froth density is 420 g/L. The density of the foam layer is 9.21 lb/ft$^3$ (147 kg/m$^3$).

Example 14

Example 12 is again repeated, this time using 230 parts of the filler and 2 parts of water. A mixture of 0.018 part of the DBTS catalyst and 0.038 part of DABCO® DBU (Air Products) catalyst are used and the surfactant level is 2 parts (added as 8 parts of the 25% mixture in polyol as before). The froth density is 430 g/L. The density of the foam layer is 9.34 lb/ft$^3$ (150 kg/m$^3$).

Example 15

Example 14 is repeated, this time using only the DBU catalyst and adjusting the isocyanate index of 110. The froth density is 430 g/L. The density of the foam layer is 8.32 lb/ft$^3$ (133 kg/m$^3$).

Example 16

Example 15 is repeated at an isocyanate index of 115. The froth density is 420 g/L. The density of the foam layer is 8.98 lb/ft$^3$ (144 kg/m$^3$).

Example 17

Example 15 is repeated again, this time at an isocyanate index of 100. The froth density is 450 g/L. The density of the foam layer is 9.82 lb/ft$^3$ (157 kg/m$^3$).

Example 18

Example 13 is repeated using 2 parts water. The froth density is 420 g/L. The density of the foam layer is 841 lb/ft$^3$ (135 kg/m$^3$).

From the foregoing, it will be observed that numerous variations and modifications may be effected without departing from the true spirit and scope of the novel concepts of the invention.

What is claimed is:

1. A process for preparing a polyurethane cushion attached to a substrate, comprising:
   a) forming a frothed polyurethane-forming composition having a density of about 300 to 600 grams per liter and a gel time of at least 180 seconds, the polyurethane-forming composition including at least one polyol, 0.5 to 3.0 parts of water per 100 parts by weight polyol, and at least one polyisocyanate in an amount sufficient to provide an isocyanate index of 85 to 130;
   b) forming a layer of the frothed composition between a substrate and a containment layer prior to any significant expansion of the polyurethane-forming composition due to the reaction of the water with polyisocyanate groups, by (i) dispensing the polyurethane-forming composition onto the substrate and forming it into a layer and then laying the containment layer atop the layer of the polyurethane-forming composition or (ii) dispensing the polyurethane-forming composition onto the containment layer and forming the composition into a layer and then laying the substrate atop the layer of the polyurethane-forming composition, wherein the substrate and the containment layer each comprises a physical barrier to the release of gases from the frothed composition and further wherein the containment layer is an impervious material or a semi-permeable material having small openings or voids that become plugged or filled when the material is brought into contact with the polyurethane-forming composition and
   c) curing the frothed composition whereby the water reacts with isocyanate groups in the polyurethane-forming composition, generating carbon dioxide gas which expands the composition between the substrate and the containment layer to form a foamed polyurethane cushion having a density of no greater than 10 pounds/cubic foot bonded to both the substrate and containment layer.

2. The process of claim 1, wherein step a) includes the step of
   a1) forming a mixture containing at least one polyol, at least one polyisocyanate, the water and at least one filler material and then
   a2) frothing the mixture from step a1).

3. The process of claim 2, wherein the catalyst is blended into the frothed mixture after step a2).

4. The process of claim 1, wherein step a) includes the step of
   a1) forming a mixture containing at least one polyol, at least one polyisocyanate and at least one filler material, then
   a2) frothing the mixture from step a1) and
   a3) adding the water to the mixture during step a2).

5. The process of claim 1, wherein the substrate is a textile.

6. The process of claim 5, wherein the textile is a woven or tufted carpet.

7. The process of claim 1, wherein the polyurethane-forming composition contains from 30 to 70% by weight of a particulate filler.

8. The process of claim 7, wherein the foamed polyurethane cushion has a density of from 4 to 10 pounds/cubic foot.

9. The process of claim 1 in which water is incorporated into the mixture in the form of a blend in a polyol in which the water is soluble to the extent of at least 30% by weight at 22° C.

10. The process of claim 2 wherein in step a1) water is added to the mixture in the form of a blend in a polyol in which the water is soluble to the extent of at least 30% by weight at 22° C.

11. The process of claim 4 wherein in step a3) water is added to the polyurethane-forming composition in the form of a blend in a polyol in which the water is soluble to the extent of at least 30% by weight at 22° C.

12. The process of claim 1, wherein step a) includes the steps of
   a1) forming a frothed mixture containing at least one polyol, at least one polyisocyanate and at least one filler material but no more than 0.1 part of water per 100 parts by weight of polyol; and
   a2) blending water or a mixture of water and additional polyol into the frothed mixture of step a1).

13. The process of claim 12, further comprising, before, during or after step a2) but after step a1), blending at least one catalyst into the frothed mixture.

14. The process of claim 13, wherein the catalyst is blended into the frothed mixture after step a2).

15. The process of claim 12, wherein the substrate is a textile.

16. The process of claim 15, wherein the textile is a woven or tufted carpet.

17. The process of claim 13, wherein the polyurethane-forming composition contains from 30 to 70% by weight of a particulate filler.

18. The process of claim 17, wherein the foamed polyurethane cushion has a density of from 4 to 10 pounds/cubic foot.

19. The process of claim 12 wherein water is added to the frothed mixture in step a2) in the form of a blend in a polyol in which the water is soluble to the extent of at least 30% by weight at 22° C.

20. The process of claim 1, wherein the frothed polyurethane-forming composition includes from 0.6 to 1.5 parts of water per 100 parts by weight polyol.

* * * * *